United States Patent [19]

Wober

[11] Patent Number: 5,748,792
[45] Date of Patent: May 5, 1998

[54] LARGE KERNEL FILTERING USING A FIXED-SIZE BLOCK PROCESSOR

[75] Inventor: Munib A. Wober, Haverhill, Mass.

[73] Assignee: Polaroid Corporation, Cambridge, Mass.

[21] Appl. No.: 696,172

[22] Filed: Aug. 13, 1996

[51] Int. Cl.⁶ .......................... G06T 9/00; H04N 1/415
[52] U.S. Cl. .......................... 382/250; 382/260; 358/433
[58] Field of Search .......................... 382/260, 261, 382/263, 264, 268, 250, 254; 364/724.12, 724.19; 358/433; 348/420; 385/432

[56] References Cited

U.S. PATENT DOCUMENTS

| 4,442,454 | 4/1984 | Powell | 348/618 |
| 4,918,742 | 4/1990 | Simonds | 364/724.12 |
| 4,984,286 | 1/1991 | Dolazza | 382/263 |
| 5,168,375 | 12/1992 | Reisch et al. | 358/432 |
| 5,563,718 | 10/1996 | Wober et al. | 358/432 |

Primary Examiner—Scott Rogers
Attorney, Agent, or Firm—Robert A. Sabourin

[57] ABSTRACT

A method and system for filtering a digital image with a filter larger than the hardware capabilities of the imaging system is workable by subdividing the large filter into a number of small filters which can each be individually processed by the system. The method includes the steps of: segmenting the digital image into data blocks of a predetermined size; overlapping adjacent data blocks by a predetermined number of pixels; providing a preselected filter kernel; generating small filters by processing a preselected group of components of the filter kernel; applying each of the small filters to each overlapped data block to produce component data blocks; and merging and saving the component data blocks into filtered data blocks according to a predetermined specific criteria, whereby the filtered data blocks represent the filtered digital image.

12 Claims, 16 Drawing Sheets

$$\text{SMALL 1} = \begin{bmatrix} a & b & c \\ b & d & e \\ c & e & g \end{bmatrix}$$

FIG. 13

$$\text{SMALL 2} = \begin{bmatrix} \emptyset & m & n \\ m & p & k \\ n & k & l \end{bmatrix}$$

FIG. 14

$$\text{SMALL 3} = \begin{bmatrix} \emptyset & x & y \\ x & w & z \\ y & z & y \end{bmatrix}$$

FIG. 15

$$\begin{vmatrix} \begin{bmatrix} \alpha_{00} & \alpha_{01} \\ \alpha_{10} & \alpha_{11} \end{bmatrix} & \begin{bmatrix} \gamma_{00} & \gamma_{01} \\ \gamma_{10} & \gamma_{11} \end{bmatrix} \\ \begin{bmatrix} \beta_{00} & \beta_{01} \\ \beta_{10} & \beta_{11} \end{bmatrix} & \begin{bmatrix} \mu_{00} & \mu_{01} \\ \mu_{10} & \mu_{11} \end{bmatrix} \end{vmatrix}$$

FIG. 18

LARGE KERNEL FILTERING USING A FIXED-SIZE BLOCK PROCESSOR

BACKGROUND OF THE INVENTION

1. Field of the Invention

The invention relates generally to an improved method and apparatus for digital image processing. More particularly, the invention relates to a novel method and apparatus for filtering a digital image in the frequency domain using a filter kernel which is conventionally considered to be too large to be used with the resident block processing hardware.

2. Description of the Prior Art

A digital image can be electronically filtered in a number of ways, including filtering in the frequency domain such as the discrete fourier transform (DFT) or the discrete even cosine transform (DCT) domain. Typically, filtering the image in the DCT domain will provide the same results as a mathematical convolution in the spatial domain.

Convolution of an image, as understood by those skilled in the art, is a process of filtering in the spatial domain by multiplying two discrete signals point-by-point, then summing the products over appropriate limits. Convolution generally results in filtering by sharpening or smoothing an image. Sharpening enhances blurry images, particularly by enhancing high frequency components representing edges in an image, whereas smoothing softens the edges of the image.

The steps required for filtering a digital image in the DCT domain in a manner which is mathematically equivalent to a convolution in the spatial domain are detailed in U.S. patent application Ser. No. 08/159,795 filed Nov. 30, 1993 by Munib A. Wober and Michael L. Reisch. The steps generally proceed as follows.

The digital image is first segmented into M×N blocks of pixels, where M and N are preselected integers. This is done to provide compatibility of the block sizes with the processing limitations of commercially available chips. For instance, 8×8 block processing chips conform to international compression standards set by JPEG (Joint Photographic Experts Group) and MPEG (Motion Picture Experts Group). Adjacent blocks of pixels are typically overlapped in the spatial domain. The amount of overlap is variable, depending on the size of the filter and the size of the DCT. The overlapped blocks are then transformed to DCT matrices or blocks in the frequency domain by taking a DCT of each overlapped block.

An odd, symmetrical filter is chosen and represented by a filter kernel defined as the signal values of the filter used for performing a specific filtering operation such as sharpening or smoothing. A discrete odd cosine transformation (DOCT) of the filter kernel is taken to generate a DOCT matrix of DOCT coefficients. Then a mask multiplied matrix is generated by mask multiplying (i.e. point-by-point multiplication) each DCT matrix times the DOCT matrix. Finally, an inverse discrete cosine transformation (IDCT) is taken of the mask multiplied matrix to generate a reconstructed filtered block of pixels in the spatial domain. These IDCT coefficients represent the filtered image.

Only certain points of the filtered block are saved. The other points within the filtered block are discarded. Specifically, the number of saved points for each block is given by $$G = N - (K-1) \quad (1)$$

where G is the number of points to be saved in each block after filtering, N is the size of the block, K is the length of the filter (which is alternatively referred to as the kernel, or the filter kernel), and $(K-1)/2$ is the amount of overlap between adjacent blocks. Note also that, due to symmetry, the number of independent coefficients (i.e. the degrees of freedom) in the filter equals $\{K-(K-1)/2\}$. For example if N=8 and K=5, then the number of saved points, G, is equal to 4. In other words, using a block size of 8 with a 5 point filter provides 4 saved filtered points from each filtered block. From equation (1) it is clear that N must be greater than or equal to K to generate any saved points G, i.e. the length of the filter can be no longer than the length of the pixel block. The above principles, of course, extend to multi-dimensional filtering.

One shortcoming to conventional image filtering occurs when the available processor has a processing capability which is smaller than the chosen filter length. This hardware limitation is present whether the filtering occurs in either the spatial or frequency domain. When filtering high quality images, such as those used in graphical arts and medical imaging, a large size filter (e.g. 9 point or 13 point) is often desirable, although the available processor may be limited to processing, for instance, 8×8 blocks of image data.

Consequently, it is a primary object of the present invention to provide a method and apparatus for filtering a digital image in either the spatial or frequency domain using a filter which is larger in size than the processing capability of the associated chip. This and other objects will become apparent from the following detailed description and drawings.

SUMMARY OF THE INVENTION

A method and system for filtering a digital image with a filter larger than the hardware capabilities of the imaging system is workable by subdividing the large filter into a number of small filters which can each be individually processed by the system.

The method includes the steps of: segmenting the digital image into data blocks of a predetermined size; overlapping adjacent data blocks by a predetermined number of pixels; providing a preselected filter kernel; generating small filters by processing a preselected group of components of the filter kernel; applying each of the small filters to each overlapped data block to produce component data blocks; and merging and saving the component data blocks into filtered data blocks according to a predetermined specific criteria, whereby the filtered data blocks represent the filtered digital image.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIGS. 2–19D are all directed towards the preferred embodiment of FIG. 1B;

FIG. 2 is a diagram depicting nine separate 8×8 pixel blocks in an area of an image where $0 \leq i \leq 15$ and $0 \leq j \leq 15$;

FIG. 5 is a diagram depicting both vertical and horizontal overlapping of the adjacent pixel blocks of FIG. 2;

FIG. 6 is a diagrammatic representation of a filtered 8×8 pixel block;

FIG. 7 is a diagram showing nine 8×8 pixel blocks before and after DCT processing;

FIGS. 8–12 are diagrammatic representations of a 5×5 point large filter kernel and the small filter coefficients generated therefrom;

FIG. 13 is a matrix representation of the small filter kernel SMALL1;

FIG. 14 is a matrix representation of the small filter kernel SMALL2;

FIG. 15 is a matrix representation of the small filter kernel SMALL3;

FIG. 16 is a diagram showing nine 8×8 DCT blocks multiplied by each of three small filters to generate three sets of filtered DCT blocks;

FIG. 17 is a diagram depicting the transformation of the three filtered 8×8 DCT blocks of FIG. 16 to the spatial domain via an IDCT;

FIG. 18 is a representation of the saved region of an 8×8 filtered pixel block;

FIG. 19D is a diagrammatic representation of the derivation of μ values for the lower right portion of the saved region of FIG. 18.

DETAILED DESCRIPTION OF THE PREFERRED EMBODIMENTS

Figure 1A:
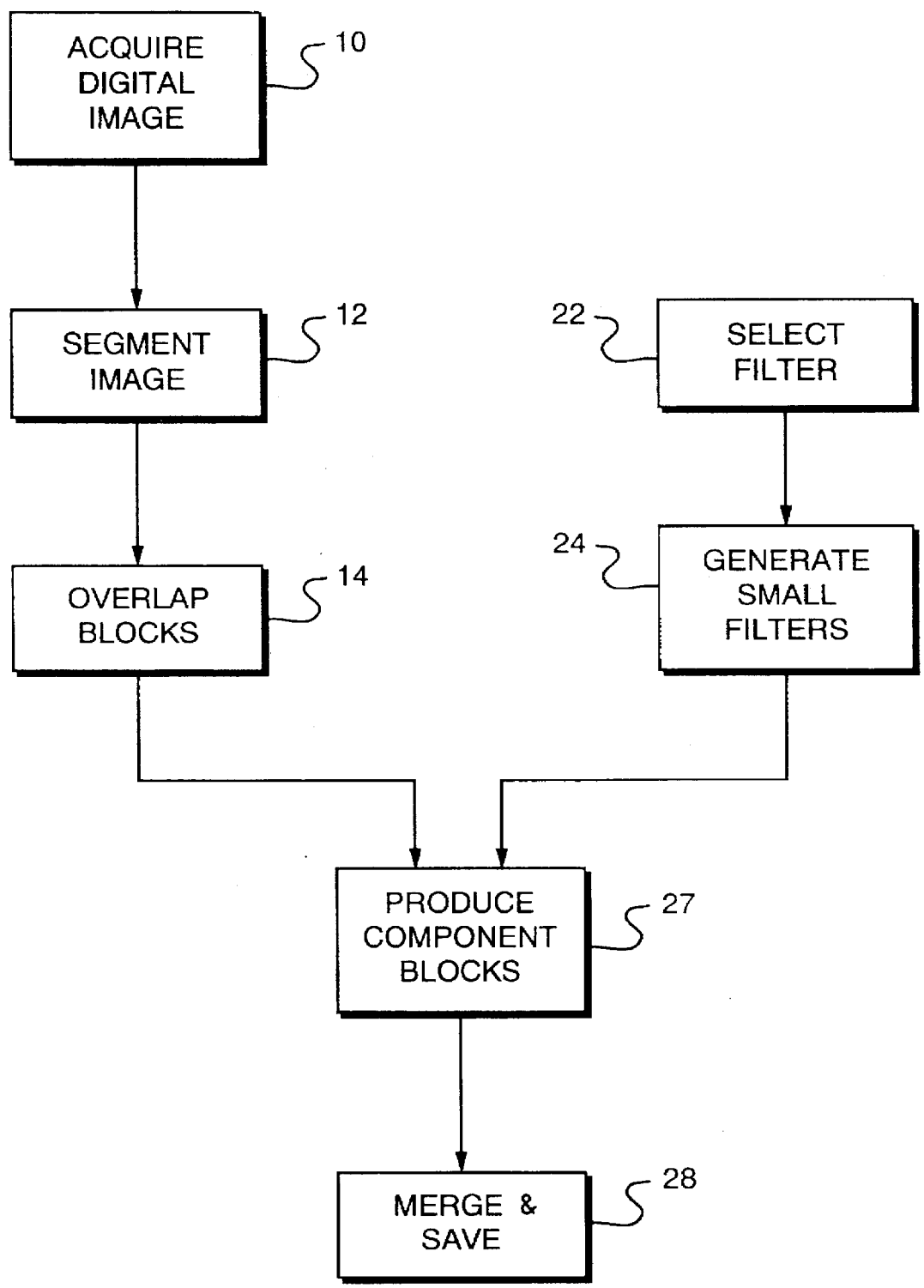
FIG. 1A is a block diagram of the inventive method.

The primary example detailed in this disclosure relates to a preferred embodiment of the invention using DCT transforms, although the inventive process is not limited to DCT processing.

1. DCT Mathematics

This section sets forth certain fundamental concepts relating to forward and inverse discrete cosine transforms.

An image is typically made up of a two-dimensional P×Q array of descriptors called pixels or image data points, where P is the number of rows and Q is the number of columns representing the image. The image can be represented by either image data points in the spatial domain, or by corresponding DCT coefficients in the frequency domain. A forward DCT generates the DCT coefficients by taking a discrete even cosine transformation (DECT abbreviated as DCT) of the image data points. Conversely, an inverse discrete even cosine transformation (IDECT abbreviated as IDCT) generates the IDCT coefficients (i.e. reconstructed image data points) by taking an inverse discrete cosine transformation of the DCT coefficients.

A DCT transformation can occur in any number of dimensions as understood by those skilled in the art. In the following one-dimensional example, a row (more generically referred to as a segment) of N image data points s(j) can be transformed from the spatial domain to corresponding DCT coefficients S(v) in the frequency domain in accordance with equation (2).

$$S(v) = C_v \sqrt{\frac{2}{N}} \sum_{j=0}^{N-1} s(j) \cos \frac{(2j+1)v\pi}{2N} \quad (2)$$

where:

j is an integer, v is an integer;

$0 \leq v \leq (N-1)$;

s(j) represents the matrix of image data points in the segment;

S(v) represents the corresponding matrix of DCT coefficients;

N represents the number of image data points in the segment;

$$C_v = \frac{1}{\sqrt{2}} \text{ for } v = 0; \text{ and}$$

$$C_v = 1 \text{ for } v \neq 0.$$

The DCT coefficients S(v) are determined from equation (2) where the normalized cosine basis terms are derived for a segment having N image data points. The value for S(0) is determined for v=0 by summing each of the image data points s(j) for $0 \leq j \leq (N-1)$ times the cosine terms of the basis function. The value for S(1) is determined as the summation of image data points s(j) times the cosine terms for v=1. This procedure, which indexes first on v and then on j, is repeated for derivation of DCT coefficients S(0) through S(N-1).

$$s'(j) = C_v \sum_{v=0}^{7} \sqrt{\frac{2}{N}} S(v) \cos \frac{(2j+1)v\pi}{16} \quad (3)$$

The corresponding one-dimensional IDCT equation is written as: for $0 \leq j \leq 7$, where s'(j) represents the reconstructed image data points.

A one dimensional discrete odd cosine transform (DOCT) matrix H(u) is shown in equation (4) where h(i) is an odd symmetrical filter kernel.

$$H(v) = 2 \sum_{j=0}^{N-1} d_j h(j) \cos \frac{jv\pi}{N} \quad (4)$$

for $0 \leq v \leq (N-1)$;

where N represents the size of the DCT block used;

h(j)=0 for |j|>(k−1)/2;

$d_j$=2 for j=0;

$d_j$=1 for i=1, 2 ... (N−1);

j, u and N are integers; and k is the kernel size.

2. The Method

One-Dimensional Processing

Figure 1B:
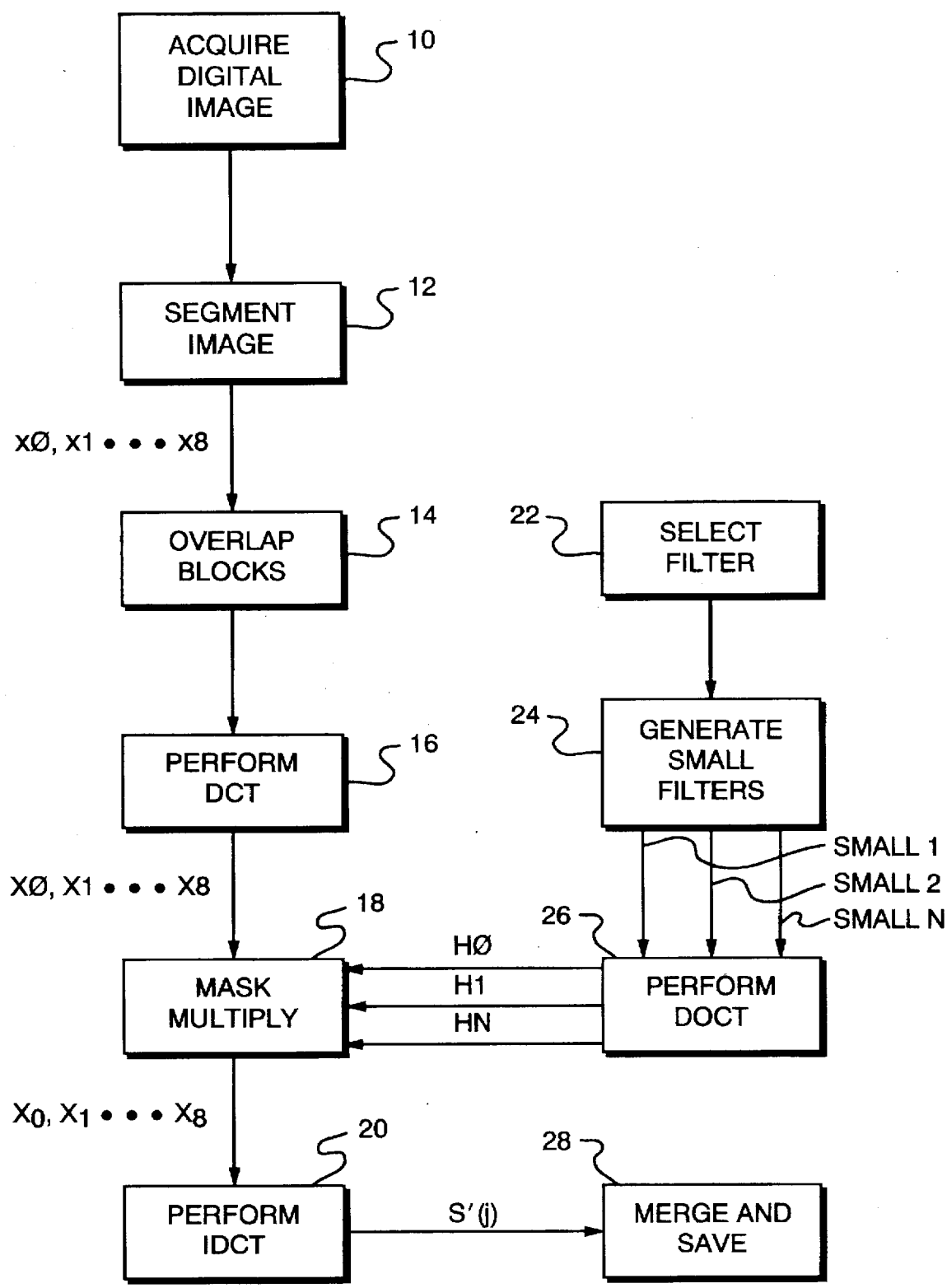
FIG. 1B is a block diagram of a preferred embodiment of the inventive method of FIG. 1.

A block diagram of a preferred embodiment of the inventive filtering method for filtering an image using a filter larger than the processing capability of the available processor is illustrated in FIG. 1. The processor is a standard 8×8 DCT chip (e.g. an MPEG or JPEG chip) which can be used to process one or two dimensional blocks of image data points. A digital image is acquired in block 10 as from a digital camera, a scanner, or a memory.

The image is segmented in block 12 into 8 point pixel blocks where a four pixel overlap is provided between adjacent pixel blocks in block 14. For instance, a first 8 point block can be represented as $\{S_0, S_1, S_2, S_3, S_4, S_5, S_6, S_7\}$, a second overlapping 8 point block can be represented as $\{S_4, S_5, S_6, S_7, S_8, S_9, S_{10}, S_{11}\}$, etc. A DCT is performed on each 8 point block of pixels in block 16. The large filter (i.e. larger than the hardware processing capability—in this case, a 9 point symmetrical filter) is selected in block 22. Typically the large filter values will be predetermined for the particular imaging system and application of interest, and they will be stored in long term memory for easy retrieval. However for the general case, any size filter can be selected which is larger than any size processor.

The selected 9 point symmetrical filter can be represented as the set $$\text{LARGE} = \{f_4, f_3, f_2, f_2, f_0, f_1, f_2, f_3, f_4\} \quad (5)$$

A 9 point pixel block can be represented as the set $$\text{IMAGE} = \{s_{-2}, s_{-1}, s_0, s_1, s_2, s_3, s_4, s_5, s_6\}, \quad (6)$$

and point-by-point filtering of IMAGE by LARGE for determining a filtered center pixel element $s_2$ yields $$s_2 = \{f_4 s_{-2} + f_3 s_{-1} + f_2 s_0 + f_1 s_1 + f_1 s_3 + f_0 s_2 + f_2 s_4 + f_3 s_5 + f_4 s_6\} \quad (7)$$

where $s_2$ represents the filtered center element $s_2$.

It is well known in the art that a symmetrical 9 point filter can be represented as a 5 point filter kernel $\{f_0, f_1, f_2, f_3, f_4\}$ having five degrees of freedom. Hence, in keeping with the objective of the inventive method for converting the 9 point filter into a number of smaller filters which can readily be processed by the available hardware, the small filters selected must account for five degrees of freedom in order to properly emulate the 9 point filter.

One of the small filters, SMALL1, is selected as a five point filter that can be implemented using a standard 8×8 block processor.

$$\text{SMALL1} = \{p_0^2, p_0^1, p_0^0, p_0^1, p_0^2\} \quad (8)$$

SMALL1 can be represented by a filter kernel having three degrees of freedom $\{p_0^0, p_0^1, p_0^2\}$. Point-by-point filtering of IMAGE by SMALL1 for determining a center pixel element, CENTER, yields $$\text{CENTER} = \{p_0^2 s_0 + p_0^1 s_1 + p_0^0 s_2 + p_0^1 s_3 + p_0^2 s_4\}. \quad (9)$$

According to the method, two more degrees of freedom are required for a total of five degrees of freedom for any combination of small filters to emulate the large filter. For instance, a second 5 point small filter $$\text{SMALL2} = \{p_1^2, p_1^1, p_1^0, p_1^1 p_1^2\} \quad (10)$$

provides two degrees of freedom when the center element $P_1^2$ is set to zero. To retain symmetry, SMALL2 should be applied to both the left and right sides of IMAGE. Note that since the processing is equivalent to 9 point filtering, the nine points of IMAGE are each considered for their effect at $S_2$. Hence, the left side of IMAGE which is point-by-point filtered by SMALL2 is represented as, $$\text{LEFT} = \{p_1^2 s_{-2} + p_1^1 s_{-1} + p_1^0 s_0 + p_1^1 s_1 + p_1^2 s_2\} \quad (11)$$

where $p_1^0 0$, and the right side of IMAGE which is point-by-point filtered by SMALL2 is represented as, $$\text{RIGHT} = \{p_1^2 s_2 + p_1^1 s_3 + p_1^0 s_4 + p_1^1 s_5 + p_1^2 s_6\} \quad (12)$$

where $p_1^0 = 0$. None of the small filters processes a group of pixels which is larger than the 8 point processing capability of the system.

The effects of the processing by the two small filters SMALL1 and SMALL2 can be combined to emulate the 9 point filtering of $s_2$ so that, $$s_2 = \text{CENTER} + \text{LEFT} + \text{RIGHT} \quad (13)$$
$$= \{p_0^2 s_0 + p_0^1 s_1 + p_0^0 s_2 + p_0^1 s_3 + p_0^2 s_4\} + \quad (14)$$
$$\{p_1^2 s_{-2} + p_1^1 s_{-1} + p_1^0 s_0 + p_1^1 s_1 + p_1^2 s_2\} +$$
$$\{p_1^2 s_2 + p_1^1 s_3 + p_1^0 s_4 + p_1^1 s_5 + p_1^2 s_6\}.$$

Solving equation (14) yields the following relationships between the LARGE filter kernel coefficients $\{f_0, f_1, f_2, f_3, f_4\}$ and both the SMALL1 and SMALL2 filter kernel coefficients $\{p_0^0, p_0^1, p_0^2\}$ and $\{p_1^1, p_1^2\}$, respectively:

$f_0 = p_1^1$;
$f_2 = p_0^2$;
$f_3 = p_1^1$;
$f_4 = p_1^2$;
$p_0^0 = f_0 - 2f_4$;
$p_0^1 = f_1 - f_3$;
$p_0^2 = f_2$;
$p_1^1 = f_3$; and
$p_1^2 = f_4$.

Since the large filter coefficients are known values, the small filter coefficients are easily solved.

Once the small filters are generated, a DOCT is taken of each small filter SMALL1, SMALL2 ... SMALLN in block 26 of FIG. 1 to yield DOCT filters H1(v), H2(v) ... HN(v), respectively. Block 18 provides for each DCT block X1, X2, X3, X4, X5, X6, X7 and X8 to be mask multiplied times each one of the DOCT filters H1, H2 ... HN to yield mask multiplied blocks $X_1, X_2 \ldots X_8$. At this point, an IDCT is performed in block 20 on each mask multiplied block $X_1, X_2 \ldots X_8$ to yield corresponding spatial domain blocks s'(j) of reconstructed image data points. The DCT domain blocks are designated by upper case letters and the spatial domain blocks are designated by lower case letters. Each original pixel block in the present example is now represented by three separate 8 point filtered blocks which are the results of the mask multiplication of each DCT block times the DOCT filters H1 and H2. The three filtered blocks corresponding to each original 8 point block must now be merged together into a single 8 point filtered block as shown in FIG. 1 at block 28.

The above procedure is followed for each 8 point block of the image until all pixels have been filtered and saved. The pixels at the left and right edges of the image can, of course, be dealt with conventionally—such as by extrapolating information from neighboring pixels or merely duplicating neighboring pixel values.

Two-Dimensional Processing

The above one-dimensional mathematics is readily expandable to multi-dimensions as understood by those skilled in the art. Furthermore, the choice (and number) of small filters is variable in keeping with the condition of equating the sum of the degrees of freedom of the small filter kernels with the total degrees of freedom of the large filter kernel.

Figure 3A:
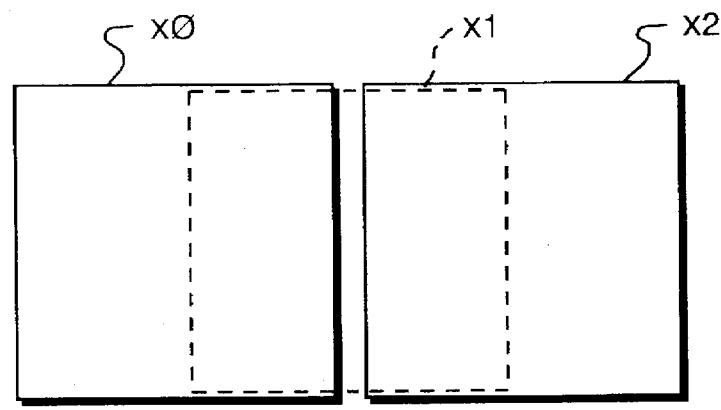
FIGS. 3A, 3B and 3C are diagrams depicting horizontal overlapping of the pixel blocks of FIG. 2.
Figure 3B:
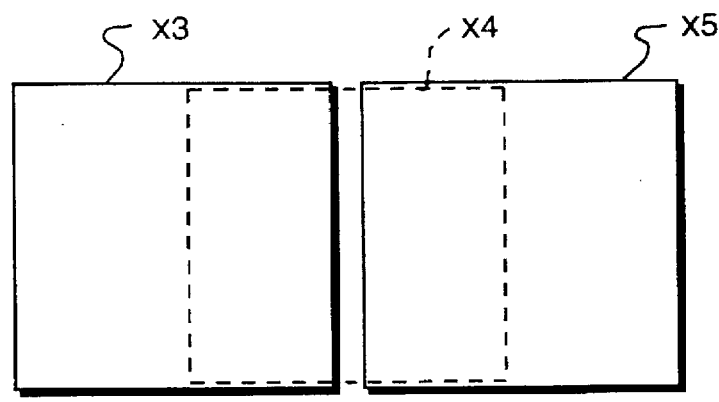
Figure 3C:
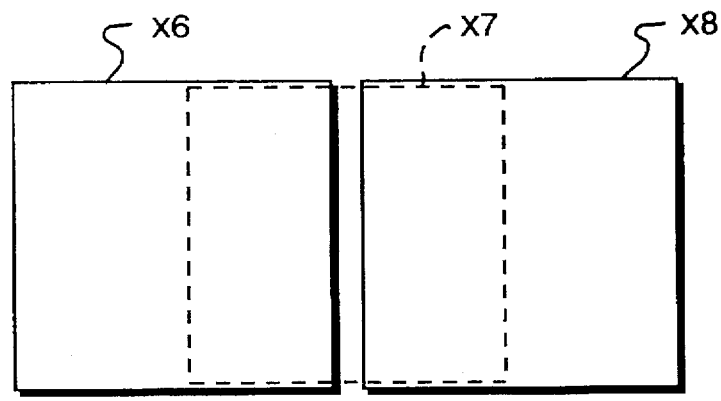
Figure 4A:
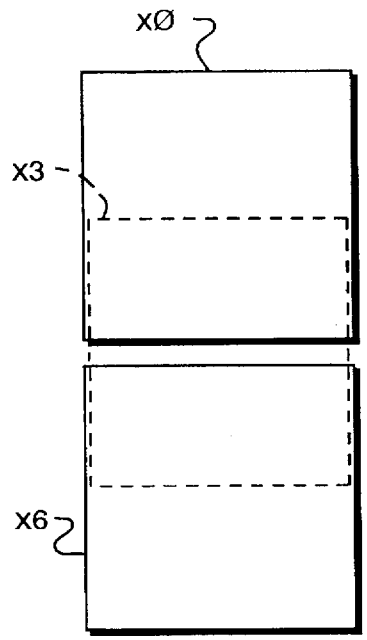
FIGS. 4A, 4B and 4C are diagrams depicting vertical overlapping of the pixel blocks of FIG. 2.
Figure 4B:
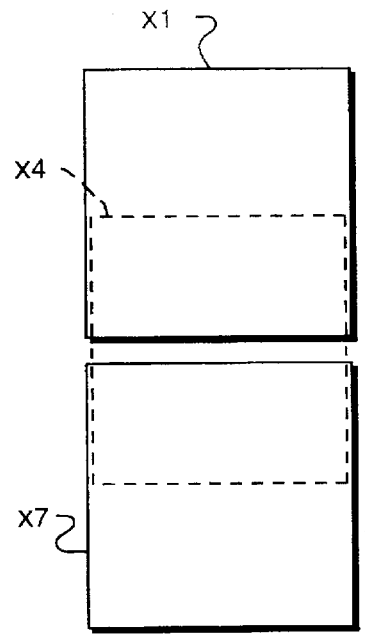
Figure 4C:
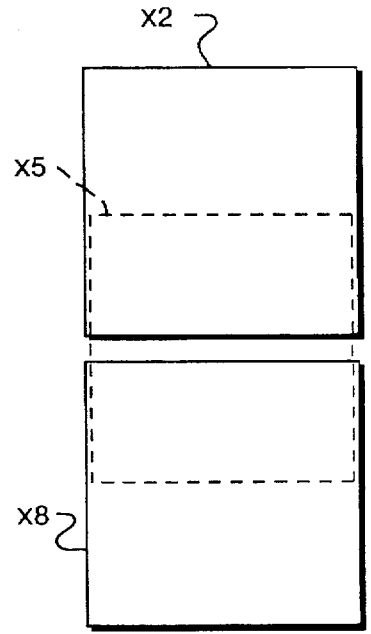
Figure 5:
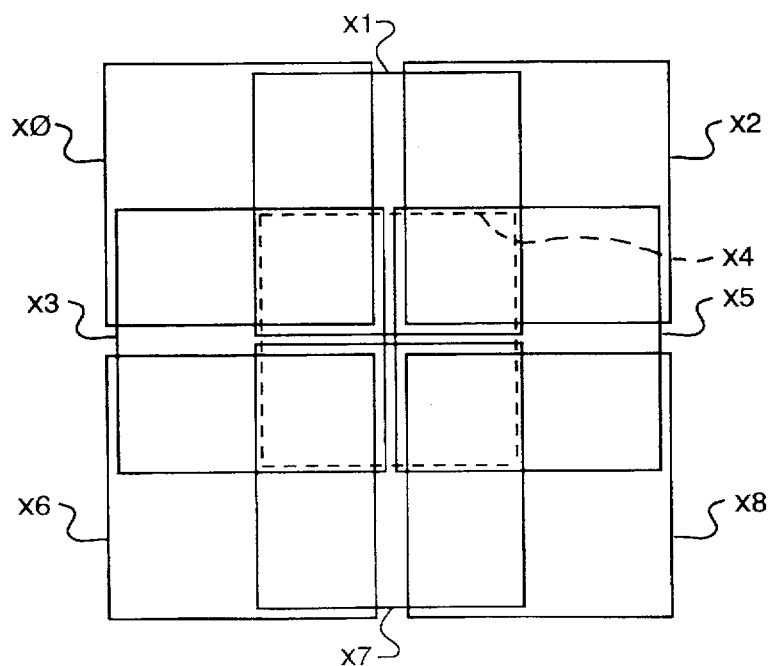
Figure 6:
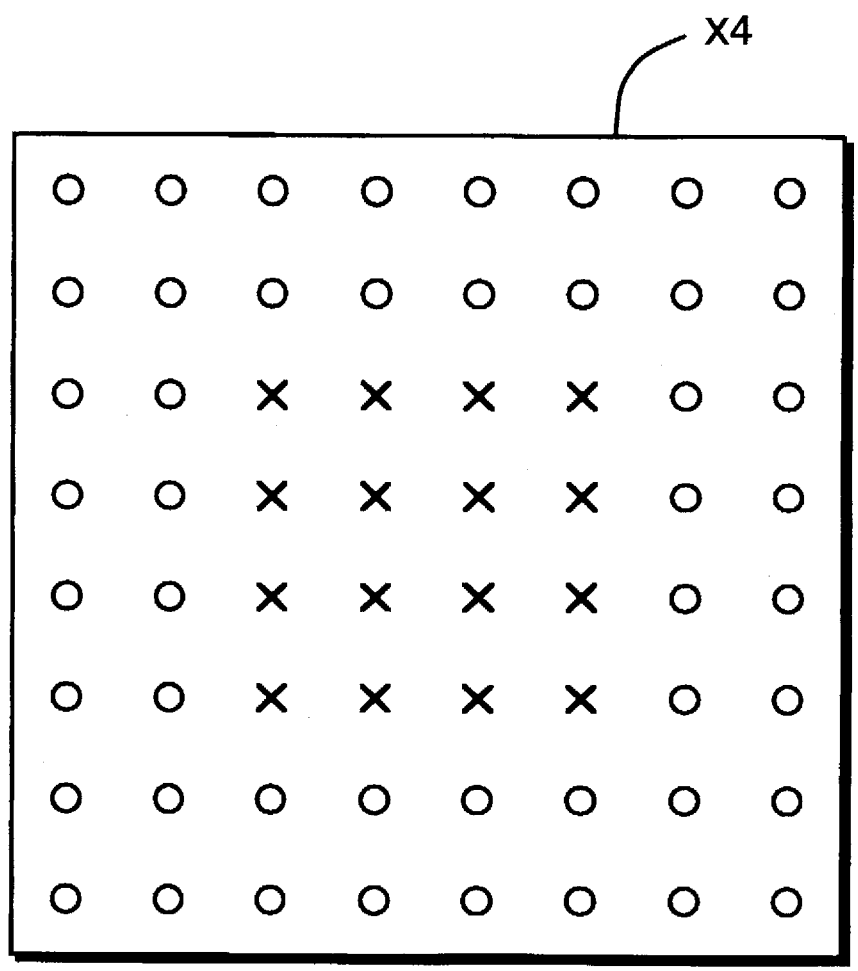

The block diagram of FIG. 1 is equally applicable for illustrating the method in multiple dimensions. The standard 8×8 DCT chip is capable of processing two dimensional blocks of image data points. First, a digital image is acquired in block 10 as from a digital camera, a scanner, or from a memory. The image is segmented in block 12 into 8×8 pixel blocks. Thereafter, adjacent pixel blocks are overlapped in block 14 by four pixels in each dimension. The overlapping procedure is illustrated in FIGS. 2 through 5. An original portion of an image where $0 \leq i \leq 15$ and $0 \leq j \leq 15$ can be broken into nine 8×8 overlapped pixel blocks (blocks x0, x1, x2, x3, x4, x5, x6, x7 and x8) shown in FIG. 2 where block x0 contains values for $0 \leq i \leq 7$, $0 \leq j \leq 7$; block x1 contains values for $4 \leq i \leq 11$, $0 \leq j \leq 7$; etc. FIG. 3A shows the 4 point horizontal overlap of block x1 with blocks x0 and x2; FIG. 3B shows the 4 point horizontal overlap of block x4 with blocks x3 and x5; and FIG. 3C shows the 4 point horizontal overlap of block x7 with blocks x6 and x8. FIG. 4A shows the 4 point vertical overlap of block x3 with blocks x0 and x6; FIG. 4B shows the 4 point vertical overlap of block x4 with blocks x1 and x7; and FIG. 4C shows the 4 point vertical overlap of block x5 with blocks x2 and x8. FIG. 5 shows the result of both horizontal and vertical 4 point overlap of the nine blocks of FIG. 2.

Figure 2:
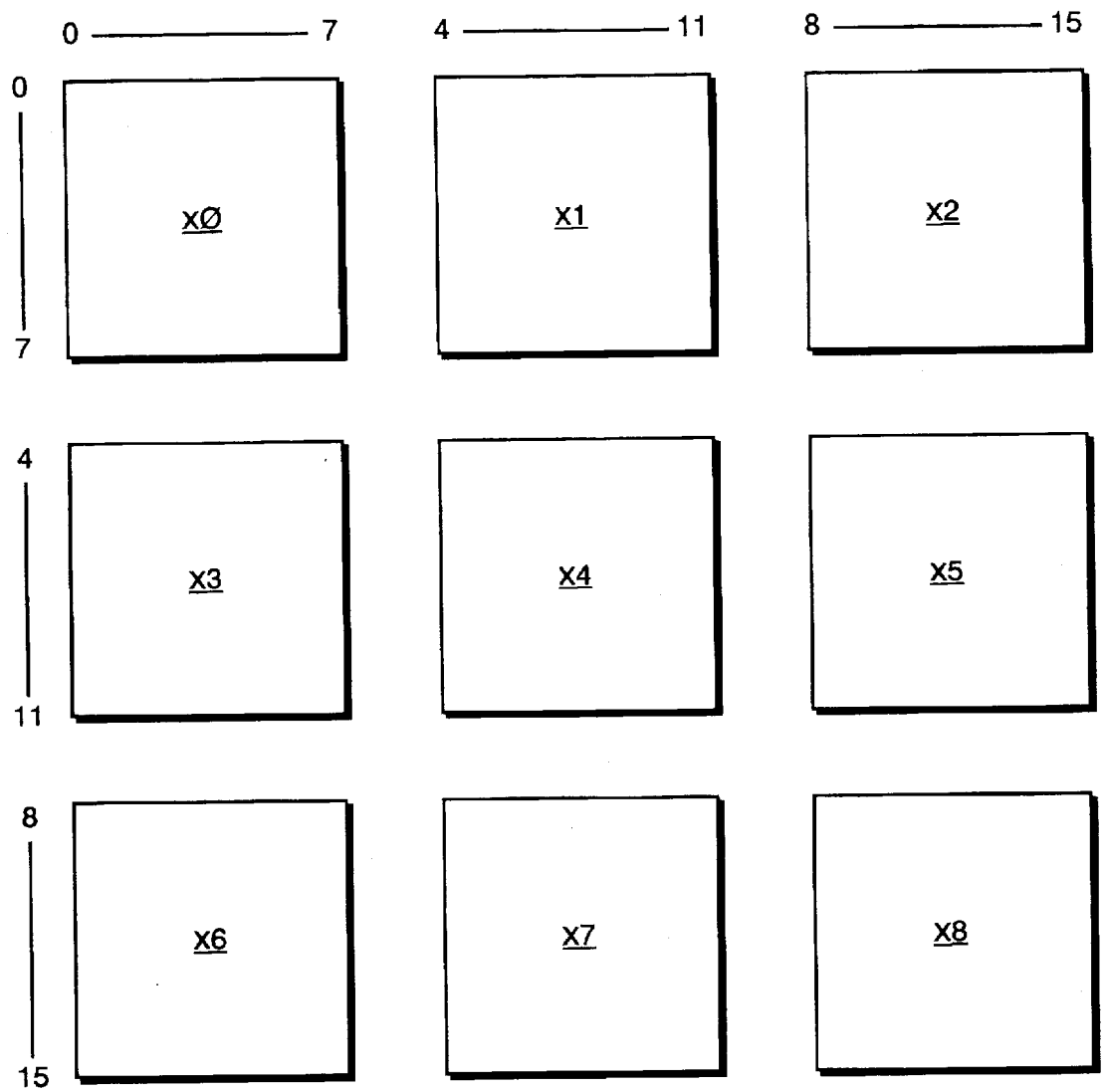
Figure 7:
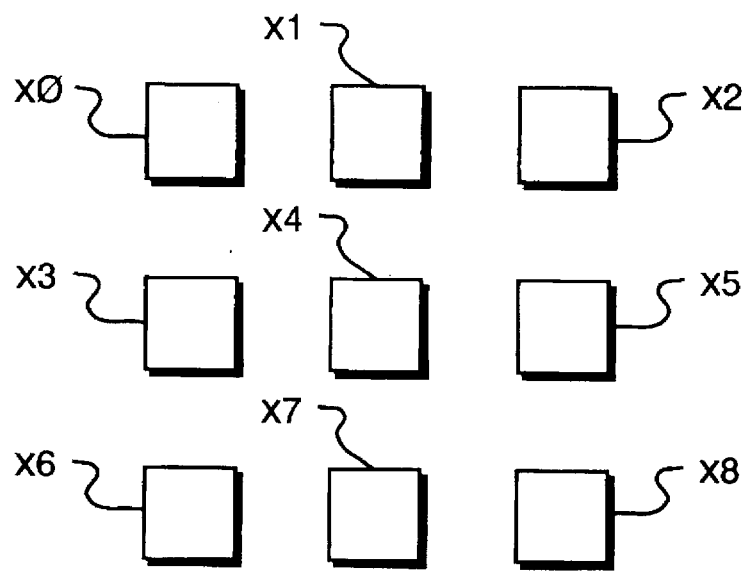
Figure 7:
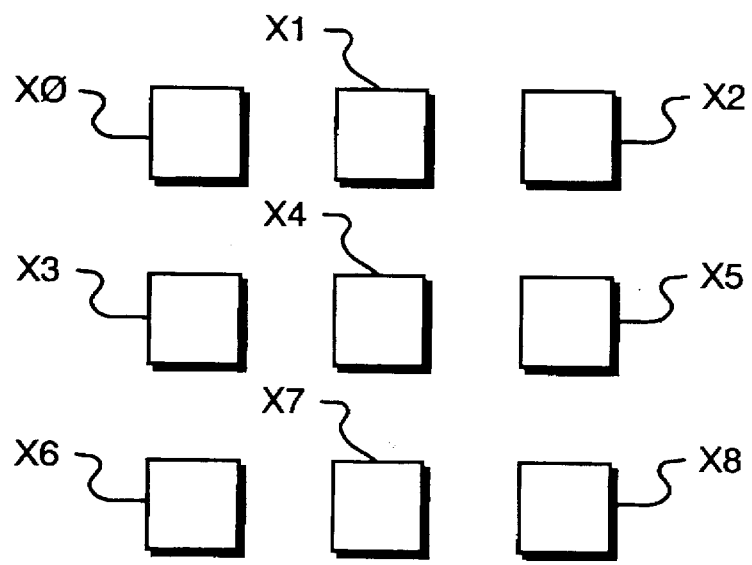

The nine 8×8 overlapped pixel blocks x0, x1, x2, x3, x4, x5, x6, x7 and x8 shown in FIG. 2 are each subjected to a discrete cosine transformation in block 16 of FIG. 1 to generate nine corresponding 8×8 DCT blocks X0, X1, X2, X3, X4, X5, X6, X7 and X8, respectively, as shown in FIG. 7. Prior to performing mask multiplication in block 18, a filter must be selected and processed.

A large filter (i.e. a filter larger than the available hardware processing capability) is selected in block 22. For this example, a 9×9 point odd symmetrical filter is selected for processing with the standard JPEG 8×8 point processor.

The selected large filter is broken into a subset of small filters in block 24. Utilizing the minimum number of small filters necessary to process the image will result in maximum efficiency although in some cases, additional small filters can be used if desired. The process of generating appropriate small filters, which together emulate the large filter, is set out below for two dimensional processing. Those skilled in the art can readily expand the two-dimensional processing set out below to higher-dimensional processing as desired.

FIGS. 8–15 are helpful in understanding how small filter coefficients are determined for two-dimensional filtering of an 8×8 block of image data points using a 9×9 filter. FIG. 13 shows a 3×3 filter kernel corresponding to a first small filter SMALL1; FIG. 14 shows a 3×3 filter kernel corresponding to a second small filter SMALL2; and FIG. 15 shows a 3×3 filter kernel corresponding to a third small filter SMALL3. The various coefficients of the small filters are derived from the known large filter coefficients. Each FIG. 8–12 depicts a filter kernel of the selected 9×9 large filter. Mathematical processing including solving simultaneous equations as described above yields the small filter coefficients {a, b, c, d, e, g, k, l, m, n, p, w, x, y, z} in terms of the known large filter coefficients.

Once the small filters are generated, a discrete odd cosine transform (DOCT) is taken of each small filter SMALL1, SMALL2 ... SMALLN in block 26 of FIG. 1 to yield DOCT filters H1(v,u), H2(v,u) ... HN(v,u). The method for generating a DOCT of a two-dimensional image block is well known in the art as described, for instance, in previously cited U.S. patent application Ser. No. 08/159,795. To facilitate multiplication of the small filters with the 8×8 pixel blocks, the small filters are padded with zeroes. Then a two-dimensional DOCT is performed on each small filter such that, $$H(v,u) = 4 \sum_{i=0}^{N-1} \sum_{j=0}^{M-1} d_i d_j h_P(j,i) \cos \frac{iu\pi}{N} \cos \frac{jv\pi}{M} \quad (15)$$

for $0 \leq u \leq (N-1)$ and $0 \leq v \leq (N-1)$,
where $h_p(j,i)$ is the two dimensional padded small filter;
  N is the number of elements of $h_p(j,i)$ in the first dimension;
  M is the number of elements of $h_p(j,i)$ in the second dimension;
  $d_i = \frac{1}{2}$ for $i=0$;
  $d_i = 1$ for $i=1, 2, \ldots (N-1)$;
  $d_j = \frac{1}{2}$ for $j=0$;
  $d_j = 1$ for $j=1, 2, \ldots (M-1)$;
  i, j, u, v, N, M are integers; and $$k_P(j,i) = 0 \text{ for } |i| \text{ or } |j| > \frac{(k-1)}{2}.$$

For the present example, $h_p(j,i)$ represents a padded small filter SMALLN (N being an integer) where H(v,u) is calculated for H1(v,u), H2(v,u) ... HN(v,u).

Figure 16:
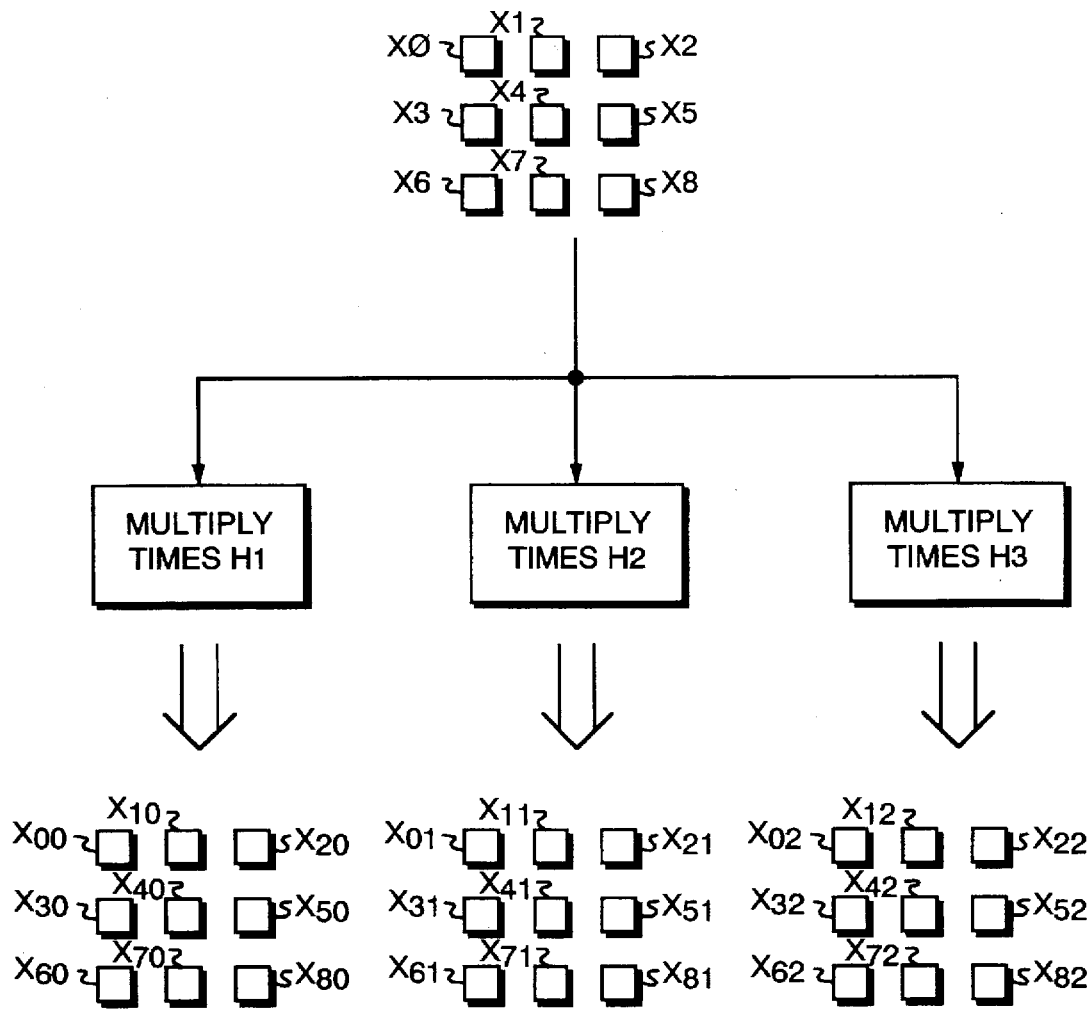
Figure 17:
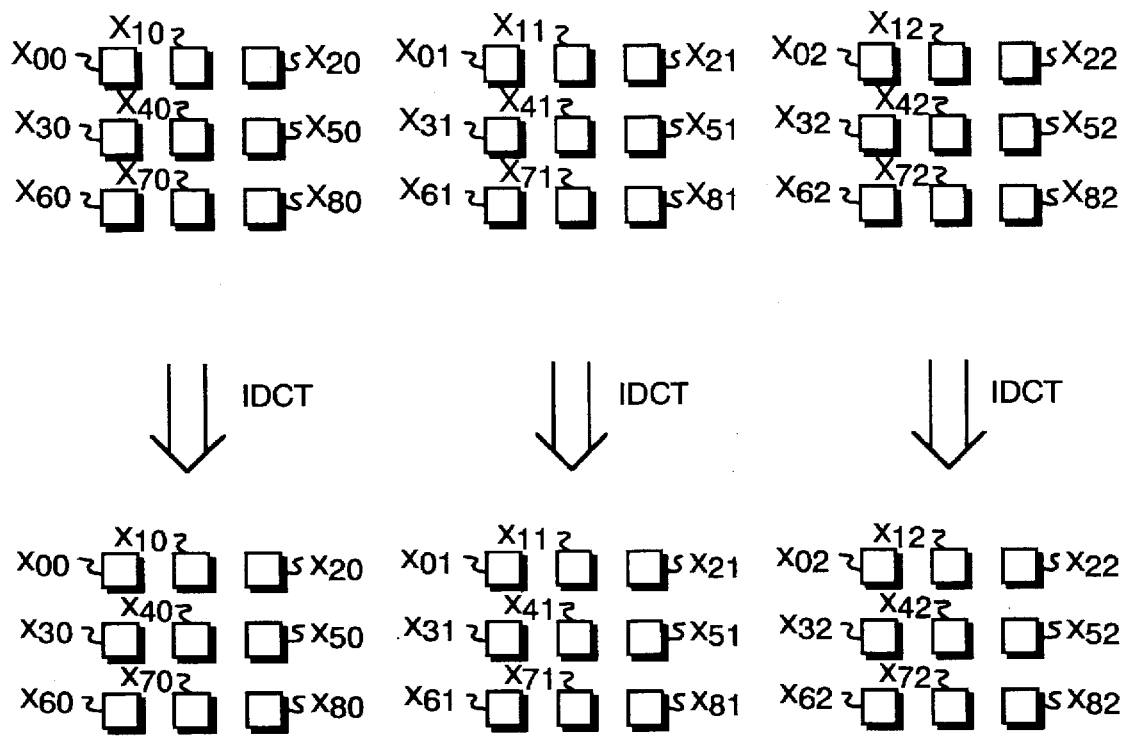

Block 18 of FIG. 1 provides for each DCT matrix X0, X1, X2, X3, X4, X5, X6, X7 and X8 to be mask multiplied times each one of the DOCT matrices H(v,u), yielding the mask multiplied blocks ($X_{00}, X_{10}, \ldots X_{82}$) that are shown in FIG. 16. At this point, an IDCT is performed in block 20 on each mask multiplied block ($X_{00}, X_{10}, \ldots X_{82}$) to yield corresponding spatial domain blocks ($x_{00}, x_{10}, \ldots x_{82}$) as shown in FIG. 17. Note that DCT domain blocks are designated by upper case letters and spatial domain blocks are designated by lower case letters. Each original pixel block is now represented by three separate 8×8 filtered blocks which are the results of the mask multiplication of each DCT block times the three DOCT filters H(v,u). The three filtered blocks corresponding to each original 8×8 block must now be merged together into a single 8×8 filtered block as shown in FIG. 1 at block 28.

The result of the complete processing of each 8×8 pixel block is a 4×4 filtered and saved region as depicted in FIG. 18. The saved region is subdivided into an upper left hand corner having four α values, an upper right hand corner having four γ values, a lower left hand corner having four β values and a lower right hand corner having four μ values. Each subdivision of the saved region is separately calculated as follows.

Figure 8:
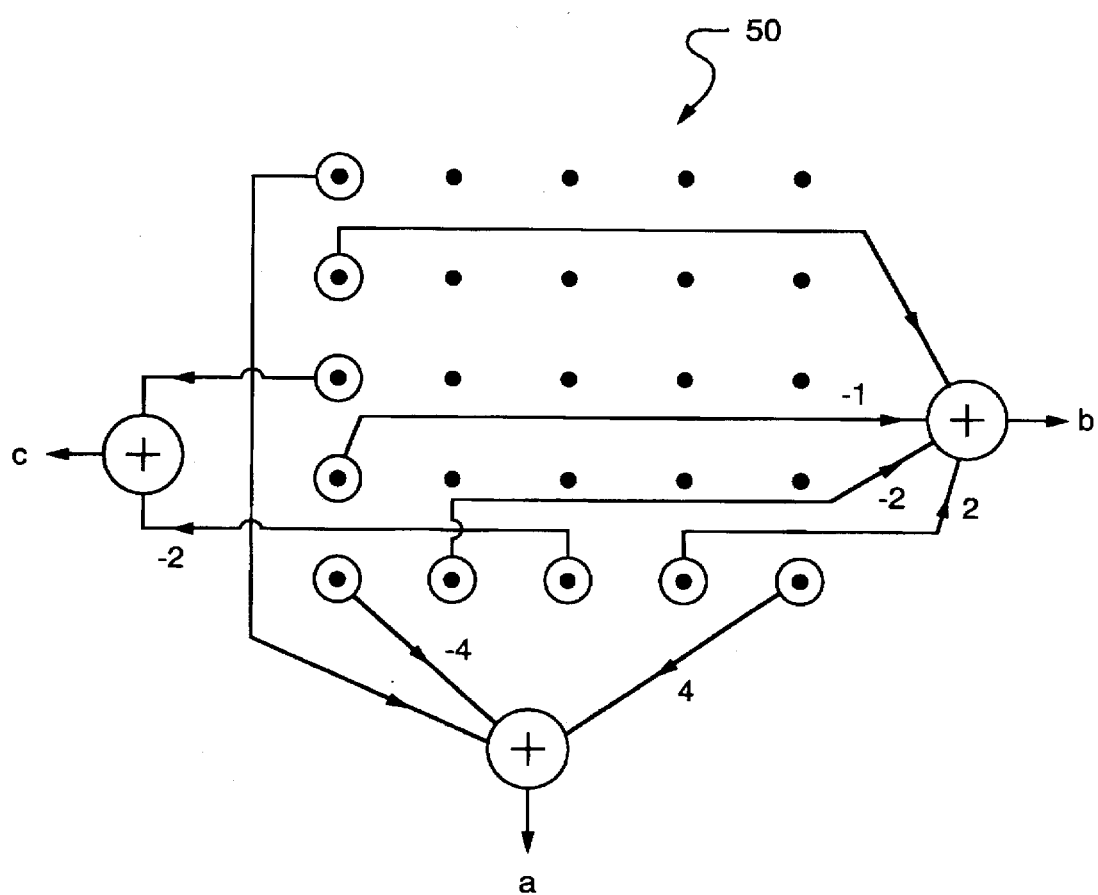
Figure 9:
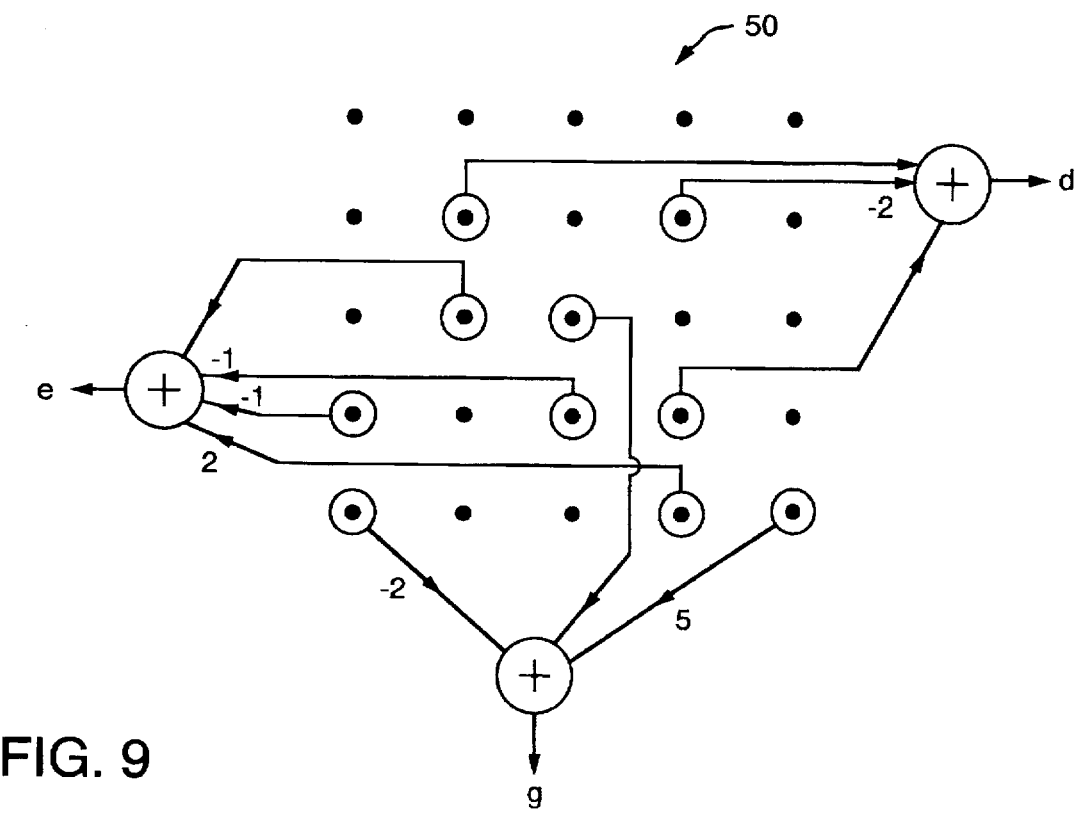
Figure 10:
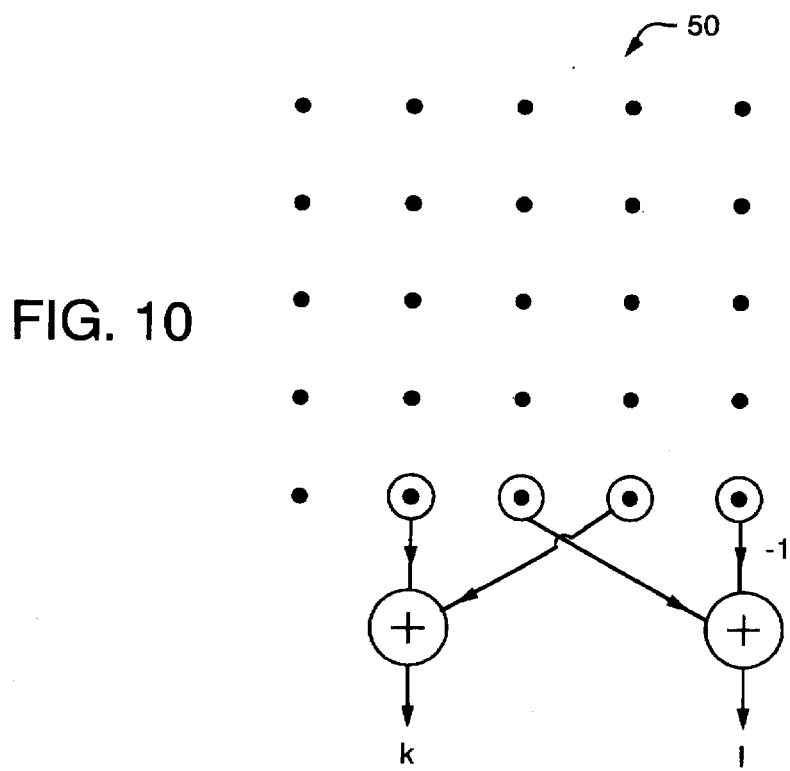
Figure 11:
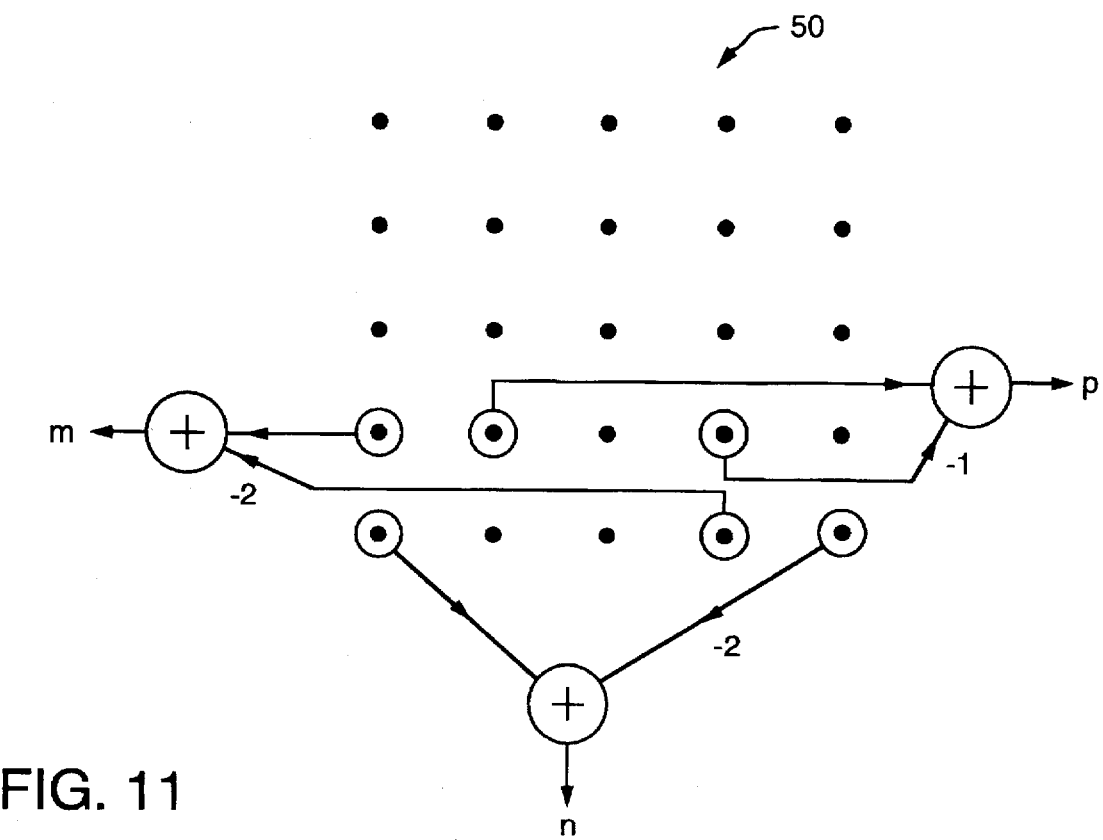
Figure 12:
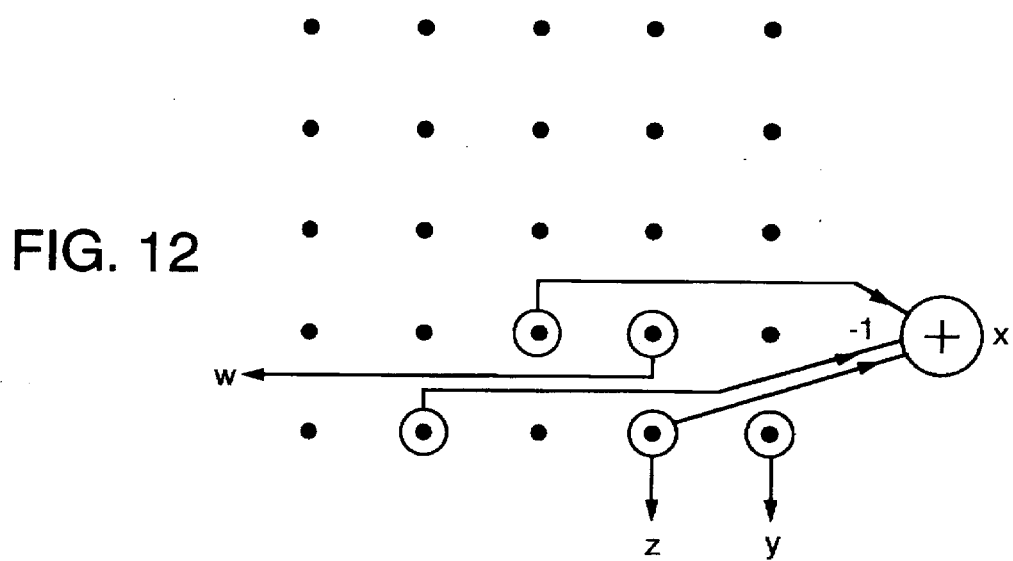
Figure 19A:
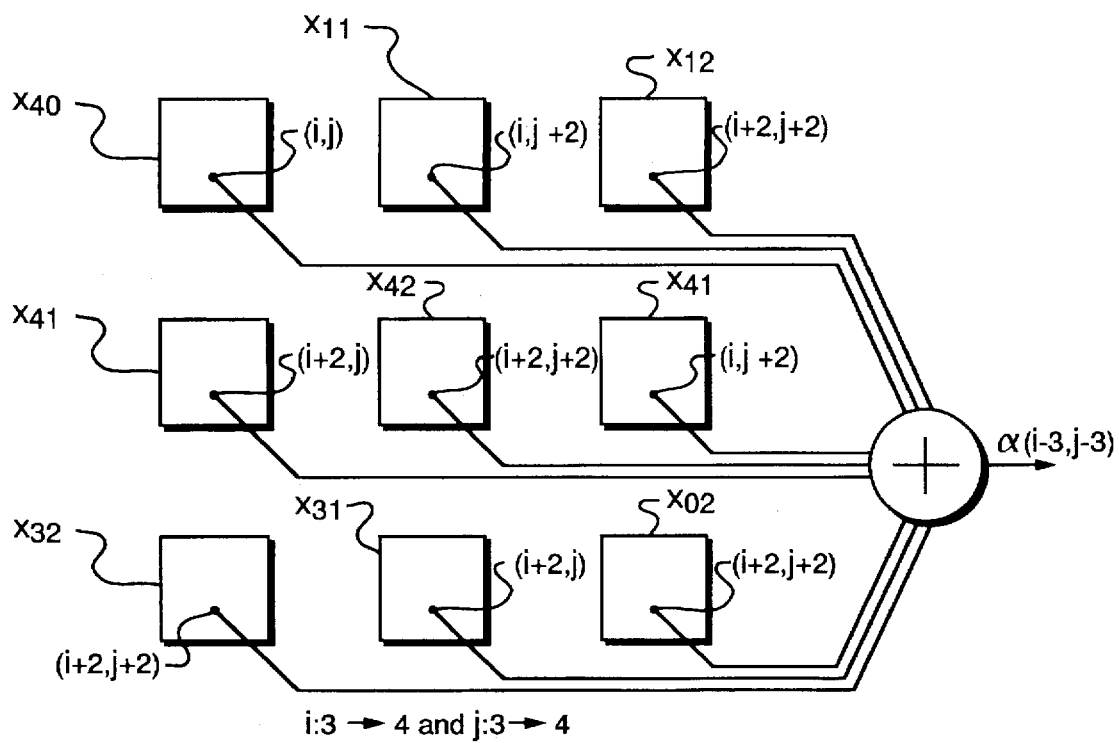
FIG. 19A is a diagrammatic representation of the derivation of α values for the upper left portion of the saved region of FIG. 18.

The four α values are determined by evaluating each of the blocks shown in FIG. 19A at i={3, 4} and j={3, 4}. Each of the nine blocks $x_{40}, x_{11}, x_{12}, x_{41}, x_{42}, x_{41}, x_{32}, x_{31}$ and $x_{02}$ is taken from the results of the IDCT of block 20 (see FIG. 1) as shown in FIG. 8. Specifically for i=3 and j=3, α(0,0) equals the sum of $x_{40}(3,3)$, $x_{11}(3,5)$, $x_{12}(5,5)$, $x_{41}(5,3)$, $x_{42}(5,5)$, $x_{41}(3,5)$, $x_{32}(5,5)$, $x_{31}(5,3)$ and $x_{02}(5,5)$. For i=3 and j=4, α(0,1) equals the sum of $x_{40}(3,4)$, $x_{11}(3,6)$, $x_{12}(5,6)$, $x_{41}(5,4)$, $x_{42}(5,6)$, $x_{41}(3,6)$, $x_{32}(5,6)$, $x_3(5,4)$ and $x_{02}(5,6)$. For i=4 and j=3, α(1,0) equals the sum of $x_{40}(4,3)$, $x_{11}(4,5)$, $x_{12}(6,5)$, $x_{41}(6,3)$, $x_{42}(6,5)$, $x_{41}(4,5)$, $x_{32}(6,5)$, $x_{31}(6,3)$ and $x_{02}(6,5)$. For i=4 and j=4, α(1,1) equals the sum of $x_{40}(4,4)$, $x_{11}(4,6)$, $x_{12}(6,6)$, $x_{41}(6,4)$, $x_{42}(6,6)$, $x_{41}(4,6)$, $x_{32}(6,6)$, $x_{31}(6,4)$ and $x_{02}(6,6)$.

Figure 19B:
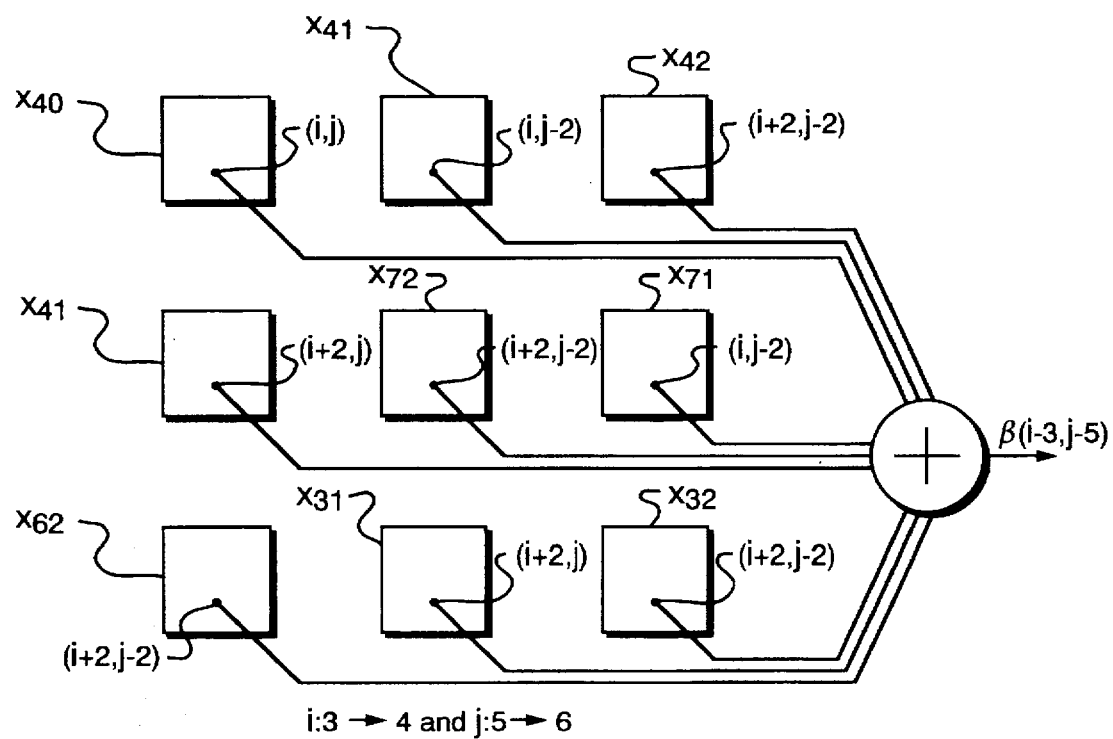
FIG. 19B is a diagrammatic representation of the derivation of β values for the lower left portion of the saved region of FIG. 18.

The four β values are determined by evaluating each of the blocks shown in FIG. 19B at i={3, 4} and j={5, 6}. Each block $x_{40}, x_{41}, x_{42}, x_{41}, x_{72}, x_{71}, x_{62}, x_{31}$ and $x_{32}$ is taken from the results of the IDCT of block 20 (see FIG. 1) as shown in FIG. 8. Specifically for i=3 and j=5, β(0,0) equals the sum of $x_{40}(3,5)$, $x_{41}(3,3)$, $x_{42}(5,3)$, $x_{41}(5,5)$, $x_{72}(5,3)$, $x_{71}(3,3)$, $x_{62}(5,3)$, $x_{31}(5,5)$ and $X_{32}(5,3)$. For i=3 and j=6, β(0,1) equals the sum of $x_{40}(3,6)$, $x_{41}(3,5)$, $x_{42}(5,4)$, $x_{41}(5,6)$, $x_{72}(5,4)$, $x_{71}(3,4)$, $X_{62}(5,4)$, $x_{31}(5,6)$ and $X_{32}(5,4)$. For i=4 and j=5, β(1,0) equals the sum of $x_{40}(4,5)$, $x_{41}(4,3)$, $x_{42}(6,3)$, $x_{41}(6,5)$, $x_{72}(6,3)$, $x_{71}(4,3)$, $x_{62}(6,3)$, $x_{31}(6,5)$ and $x_{32}(6,3)$. For i=4 and j=6, β(1,1) equals the sum of $x_{40}(4,6)$, $x_{41}(4,4)$, $x_{42}(6,4)$, $x_{41}(6,6)$, $x_{72}(6,4)$, $x_{71}(4,4)$, $x_{62}(6,4)$, $x_{31}(6,6)$ and $x_{32}(6,4)$.

Figure 19C:
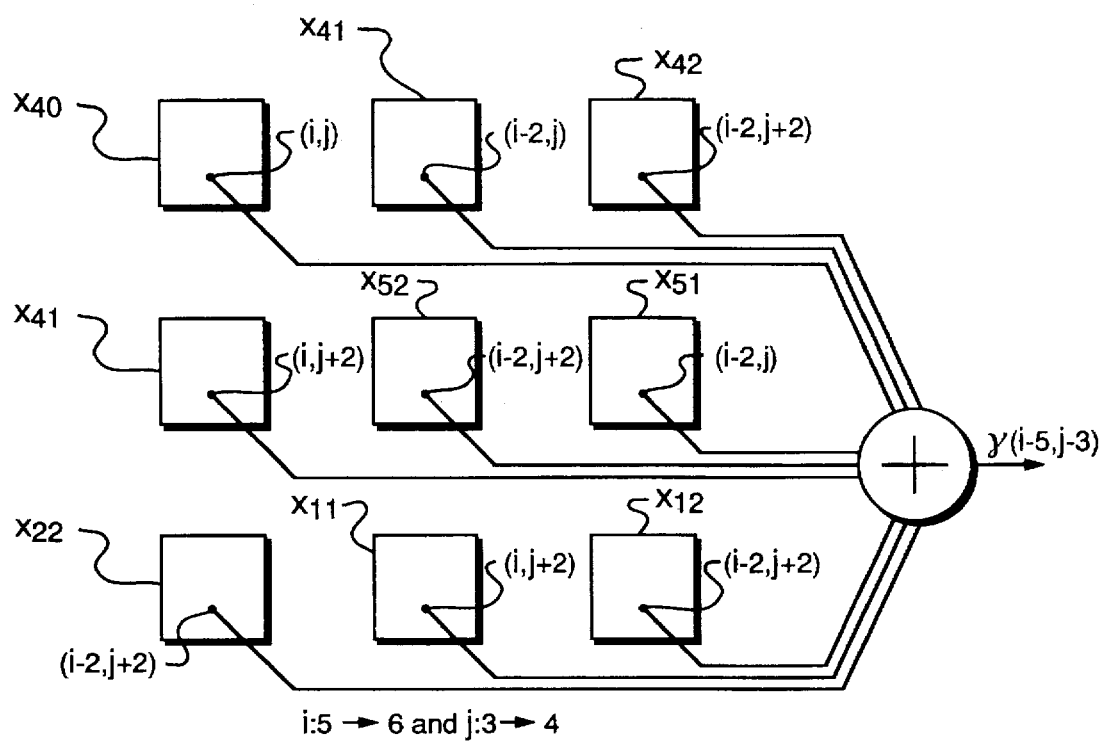
FIG. 19C is a diagrammatic representation of the derivation of γ values for the upper right portion of the saved region of FIG. 18.

The four γ values are determined by evaluating each of the blocks shown in FIG. 19C at i={5, 6} and j={3, 4}. Each of the nine blocks $x_{40}$, $x_{41}$, $x_{42}$, $x_{41}$, $x_{52}$, $x_{51}$, $x_{22}$, $x_{11}$ and $x_{12}$ is taken from the results of the IDCT of block 20 (see FIG. 1) as shown in FIG. 8. Specifically for i=5 and j=3, γ(0,0) equals the sum of $x_{40}(5,3)$, $x_{41}(3,3)$, $x_{42}(3,5)$, $x_{41}(5,5)$, $x_{52}(3,5)$, $x_{51}(3,3)$, $x_{22}(3,5)$, $x_{11}(5,5)$ and $x_{12}(3,5)$. For i=5 and j=4, γ(0, 1) equals the sum of $x_{40}(5,4)$, $x_{41}(3,4)$, $x_{42}(3,6)$, $x_{41}(5,6)$, $x_{52}(3,6)$, $x_{51}(3,4)$, $x_{22}(3,6)$, $x_{11}(5,6)$ and $x_{12}(3,6)$. For i=6 and j=3, γ(1,0) equals the sum of $x_{40}(6,3)$, $x_{41}(4,3)$, $x_{42}(4,5)$, $x_{41}(6,5)$, $x_{52}(4,5)$, $x_{51}(4,3)$, $x_{22}(4,5)$, $x_{11}(6,5)$ and $x_{12}(4, 5)$. For i=6 and j=4, γ(1,1) equals the sum of $x_{40}(6,4)$, $x_{41}(4,4)$, $x_{42}(4,6)$, $x_{41}(6,6)$, $x_{52}(4,6)$, $x_{51}(4,6)$, $x_{22}(4,6)$, $x_{11}(6,6)$ and $x_{12}(4,6)$.

Figure 19D:
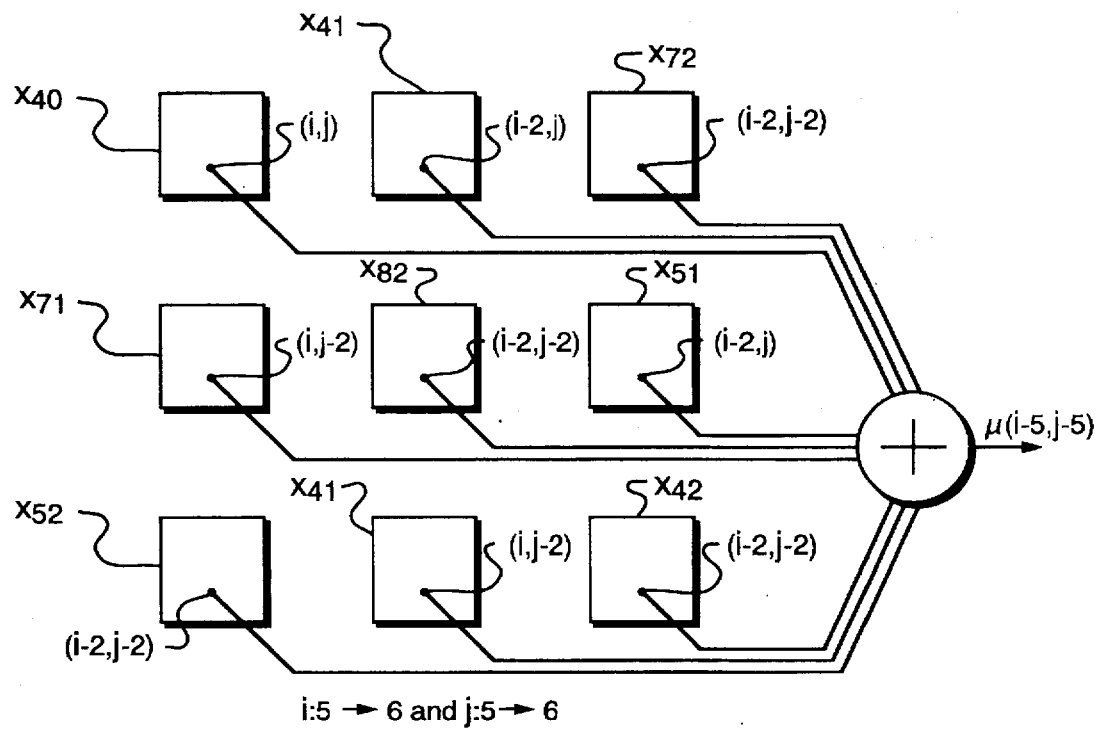

The four μ values are determined by evaluating each of the blocks shown in FIG. 19D at i={5, 6} and j={5, 6}. Each of the nine blocks $x_{40}$, $x_{41}$, $x_{71}$, $x_{82}$, $x_{51}$, $x_{52}$, $x_{41}$ and $x_{42}$ is taken from the results of the IDCT of block 20 (see FIG. 1) as shown in FIG. 8. Specifically for i=5 and j=5, μ(0,0) equals the sum of $x_{40}(5,5)$, $x_{41}(3,5)$, $x_{72}(3,3)$, $x_{71}(5,3)$, $x_{82}(3,3)$, $x_{51}(3,5)$, $x_{52}(3,3)$, $x_{41}(5,3)$ and $x_{42}(3,3)$. For i=5 and j=6, μ(0,1) equals the sum of $x_{40}(5,6)$, $x_{41}(3,6)$, $x_{72}(3,4)$, $x_{71}(5,4)$, $x_{82}(3,4)$, $x_{51}(3,6)$, $x_{52}(3,4)$, $x_{41}(5,4)$ and $x_{42}(3,4)$. For i=6 and j=5, μ(1,0) equals the sum of $x_{40}(6,5)$, $x_{40}(4,5)$, $x_{72}(4,3)$, $x_{71}(6,3)$, $x_{82}(4,3)$, $x_{52}(4,5)$, $x_{52}(4,3)$, $x_{41}(6,3)$ and $x_{42}(4,5)$. For i=6 and j=6, μ(1,1) equals the sum of $x_{40}(6,6)$, $x_{41}(4,6)$, $x_{72}(4,4)$, $x_{71}(6,4)$, $x_{82}(4,4)$, $x_{51}(4,6)$, $x_{52}(4,4)$, $x_{41}(6,4)$ and $x_{42}(4,4)$.

The above procedure is followed for each 8×8 block of the image until all pixels in the image have been filtered and saved. The pixels around the perimeter of the image can, of course, be dealt with conventionally—such as by extrapolating information from neighboring pixels or merely duplicating neighboring pixel values.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A method for filtering a digital image, comprising the steps of:

segmenting said image into data blocks of a predetermined size;

overlapping adjacent said data blocks by a predetermined number of pixels;

providing a preselected filter kernel;

generating small filters by processing a preselected group of components of said filter kernel;

applying each said small filter to each said overlapped data block to produce component data blocks;

merging and saving said component data blocks into filtered said data blocks according to a predetermined specific criteria, said filtered data blocks representing the filtered digital image.

2. A method for filtering a digital image, comprising the steps of:

segmenting said image into data blocks of a predetermined size;

overlapping adjacent said data blocks by a predetermined number of pixels;

generating DCT blocks by performing a discrete cosine transform (DCT) on each said overlapped data block;

providing a preselected filter kernel;

generating small filters by processing a preselected group of components of said filter kernel;

generating DOCT filters by performing a discrete odd cosine transformation (DOCT) on each said small filter;

generating mask multiplied blocks by mask multiplying each DCT block times each DOCT filter;

generating IDCT blocks by performing an inverse discrete cosine transform (IDCT) on each said mask multiplied block; and merging and saving said IDCT blocks into filtered data blocks according to a predetermined specific criteria, said filtered data blocks representing the filtered digital image.

3. A method for filtering a digital image, comprising the steps of:

segmenting said image into data blocks of a predetermined size;

overlapping adjacent said data blocks by a predetermined number of pixels to generate overlapped blocks;

providing a large filter having predetermined large filter coefficients, said large filter represented by a large filter kernel having predetermined degrees of freedom;

generating a number of small filters, having small filter coefficients, to emulate said large filter by establishing a mathematical relationship between said large filter coefficients and said small filter coefficients;

producing component data blocks by point-by-point filtering of said overlapped blocks with said small filters; and emulating filtering of the image with said large filter by combining said component data blocks.

4. The method of claim 3, wherein the step of generating small filters comprises:

determining one filtered pixel value, represented in terms of said large filter coefficients, by point-by-point filtering of the image with said large filter;

selecting said small filters to emulate said large filter by accounting for said predetermined degrees of freedom;

applying said small filters to portions of the image via point-by-point filtering to obtain values represented in terms of said small filter coefficients; and determining said small filter coefficients by equating said one filtered pixel value with said values, then substituting said large kernel coefficients into said equation.

5. The method of claim 3, further comprising the steps of:

generating DCT blocks by performing a discrete cosine transform (DCT) on each said overlapped data block;

generating DOCT filters by performing a discrete odd cosine transformation (DOCT) on each said small filter;

generating mask multiplied blocks by mask multiplying said DCT blocks times said DOCT filters;

generating IDCT blocks by performing an inverse discrete cosine transform (RDCT) on each said mask multiplied block; and merging and saving said IDCT blocks into filtered data according to said predetermined criteria, said filtered data representing the filtered digital image.

6. The method of claim 5, wherein said merging and saving step comprises selecting a number of IDCT blocks equal to or greater than the number of small filters.

7. The method of claim 6 wherein the merging and saving step further comprises obtaining said filtered data by combining one preselected pixel value from each one of the selected IDCT blocks.

8. An apparatus for filtering a digital image, comprising:

means for segmenting the image into data blocks of a predetermined size;

means for overlapping adjacent said data blocks by a predetermined number of pixels to generate overlapped blocks;

means for providing a large filter having predetermined large filter coefficients, said large filter represented by a large filter kernel having predetermined degrees of freedom;

means for generating a number of small filters, having small filter coefficients, to emulate said large filter by establishing a mathematical relationship between said large filter coefficients and said small filter coefficients;

means for producing component data blocks by point-by-point filtering of said overlapped blocks with said small filters; and means for emulating filtering of the image with said large filter by combining said component data blocks.

9. The apparatus of claim 8 wherein the means for generating small filters comprises:

means for determining one filtered pixel value, represented in terms of said large filter coefficients, by point-by-point filtering of the image with said large filter;

means for selecting said small filters to emulate said large filter by accounting for said predetermined degrees of freedom;

means for applying said small filters to portions of the image via point-by-point filtering to obtain values represented in terms of said small filter coefficients; and means for determining said small filter coefficients by equating said one filtered pixel value with said values, then substituting said large kernel coefficients into said equation.

10. The apparatus of claim 8, further comprising:

means for generating DCT blocks by performing a discrete cosine transform (DCT) on each said overlapped data block;

means for generating DOCT filters by performing a discrete odd cosine transformation (DOCT) on each said small filter;

means for generating mask multiplied blocks by mask multiplying said DCT blocks times said DOCT filters;

means for generating IDCT blocks by performing an inverse discrete cosine transform (IDCT) on each said mask multiplied block; and means for merging and saving said IDCT blocks into filtered data according to said predetermined criteria, said filtered data representing the filtered digital image.

11. The apparatus of claim 10, wherein the means for merging and saving comprises for selecting a number of IDCT blocks equal to or greater than the number of small filters.

12. The apparatus of claim 11 wherein the means for merging and saving further comprises means for obtaining said filtered data by combining one preselected pixel value from each one of the selected IDCT blocks.

* * * * *